(12) United States Patent
Kemeny

(10) Patent No.: US 6,763,446 B1
(45) Date of Patent: Jul. 13, 2004

(54) SYSTEMS AND METHODS FOR HANDLING STORAGE ACCESS REQUESTS

(75) Inventor: John Kemeny, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 357 days.

(21) Appl. No.: 09/924,777

(22) Filed: Aug. 8, 2001

(51) Int. Cl.$^7$ .............................................. G06F 12/00
(52) U.S. Cl. ...................... 711/173; 711/4; 711/102; 711/170; 711/171; 711/172; 711/207; 711/208; 707/206
(58) Field of Search ................... 711/4, 173, 202–207, 711/102, 103, 104, 170–172, 165, 208, 209; 707/206

(56) References Cited

U.S. PATENT DOCUMENTS

| | | | | |
|---|---|---|---|---|
| 5,829,012 A | * | 10/1998 | Marlan et al. ............... | 711/102 |
| 5,832,263 A | * | 11/1998 | Hansen et al. ............... | 709/322 |
| 5,940,850 A | * | 8/1999 | Harish et al. ................ | 711/102 |
| 5,974,564 A | * | 10/1999 | Jeddeloh ......................... | 714/8 |
| 6,052,798 A | * | 4/2000 | Jeddeloh ......................... | 714/8 |
| 6,351,822 B1 | * | 2/2002 | Wright et al. ................... | 714/8 |
| 2002/0023225 A1 | * | 2/2002 | Lomnes ....................... | 713/200 |

OTHER PUBLICATIONS

"What's Going on Inside the Box? ISV Access to Symmetrix Performance and Utilization Metrics", Jan. 2000, EMC Corporation.
"Growing an Enterprise Application Environment: A Guide to Achieving Terabyte Scalability", Aug. 1997.
"Symmetrix 8000 Enterprise Storage System: Product Description Guide", 2000, EMC Corporation.

\* cited by examiner

*Primary Examiner*—Mano Padmanabhan
*Assistant Examiner*—Jasmine Song
(74) *Attorney, Agent, or Firm*—Kevin A. Oliver; Foley Hoag LLP

(57) ABSTRACT

In general, in one aspect, the description includes a method of responding to storage access requests. The method includes defining at least one write area and at least one read-only area, receiving a write request specifying a first address that resides within the at least one read-only area, determining a second address in the write address area, and storing data associating the first address with the second address.

20 Claims, 15 Drawing Sheets

SYSTEMS AND METHODS FOR HANDLING STORAGE ACCESS REQUESTS

BACKGROUND

The storage capacities of data storage systems have grown enormously. For example, EMC Corporation's Symmetrix® data storage system can offer storage measured in Terabytes. To offer this storage, a Symmetrix® system pools a collection of physical disks (also referred to as "spindles").

Each physical disk can respond to a limited number of I/O (Input/Output) operations (e.g., read and write requests) in a given time period. The number of I/O operations a physical disk can handle is often measured in IOPS (Input/Output operations per second). To respond to I/O requests quickly and conserve IOPS, many systems use a high-speed cache (pronounced "cash"). For example, a cache can store copies of data also stored on a physical disk. If the system can respond to a request using a copy of data stored in the cache instead of retrieving data from the physical disk, the system has both reduced response time and reduced the I/O burden of the physical disks.

A cache can also speed responses to write requests. For example, the Symmetrix® system can store write requests in a cache and defer storage of the information to a physical disk until later. Thus, a host requesting the write operation receives fast confirmation of the write operation from the storage system even though the write operation has not yet completed.

SUMMARY

In general, in one aspect, the description includes a method of responding to storage access requests. The method includes defining at least one write area and at least one read-only area, receiving a write request specifying a first address that resides within the at least one read-only area, determining a second address in the write address area, and storing data associating the first address with the second address.

Embodiments may include one or more of the following features. The method may further include storing information included in the write request at the second address. Determining the second address may include determining the next sequential address of a write area. The method may further include receiving a read request specifying the first address, accessing the data associating the first address and the second address, and requesting information stored at the second address. The method may further include redefining the write area and read area to form at least one new write area and at least one new read area where at least a portion of the new read-only area occupies an area previously occupied by the write area. The method may further include defining a third area for storing a copy of at least one of the read-only areas, copying data stored in at least one of the read-only areas into the third area, and collecting free blocks of the third area.

In general, in another aspect, the description includes a computer program product, disposed on a computer readable medium, for responding to storage access requests. The computer program includes instructions for causing a processor to define at least one write area and at least one read-only area, receive a write request specifying a first address that resides within the at least one read-only area, determine a second address in the write address area, and store data associating the first address with the second address.

In general, in another aspect, the description includes a method of managing storage. The method includes defining a read-only storage area, a write storage area, and a first garbage storage area. The method also includes repeatedly redirecting write requests for an address within the read-only storage area to the write area, collecting free space in the garbage storage area, and defining a new read-only storage area, a new write storage area, and a new garbage storage area such that the new read-only area includes the previously defined write area and the new write area includes collected free space in the new garbage storage area.

Embodiments may include one or more of the following features. The method may further include copying data stored in the new read-only storage area to the new garbage storage area. The storage areas may be physical storage areas. The write requests may specify a physical address.

In general, in another aspect, the description includes a system for handling I/O (Input/Output) requests. The system includes a collection of storage disks and a block table associating addresses specified by the I/O requests with addresses of the storage disk. The block table also defines at least one read-only area of the storage disks, at least one write area of the storage disks, and at least one third area of the storage disks. The system also includes instructions for causing a processor to process a read request by accessing the block table to determine the storage disk address associated with the-address specified by the request. The system also includes-instructions for causing a processor to process a write request that specifies a storage disk address corresponding to the at least one read-only area of the storage disks by determining a next location in the at least one write area and storing information in the block table that associates the location in the at least one write area with the storage disk address specified by the write request.

Advantages will become apparent in view of the following description, including the figures and the claims.

DETAILED DESCRIPTION

Figure 1:
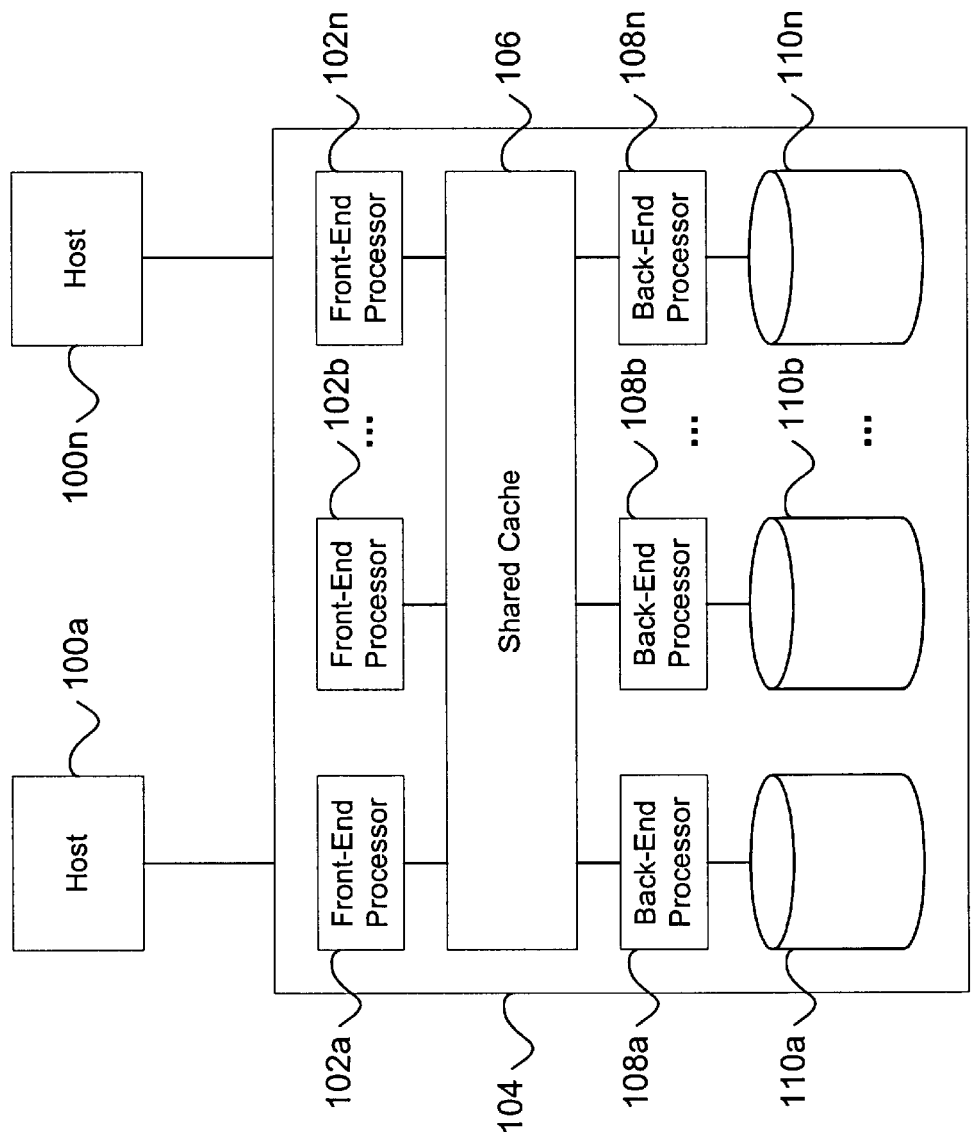
FIG. 1 is a diagram of a data storage system.

Data storage systems often handle a very large number of I/O requests. For example, FIG. 1 illustrates a Symmetrix® data storage system 104 that handles I/O requests received from multiple hosts 100a–100n. As shown, the system 104 includes a cache 106 to speed host 100a–100n access to data stored by collections of physical disks 110a–110n. The system 104 also includes front-end processors 102a–102n that process I/O requests received from the host computers 100a–100n. For example, for a read request, the front-end processors 102a–102n can determine whether the cache 106 currently holds a requested data block. If so, the front-end processors 102a–102n can quickly satisfy the host computer's 100a–100n request using the cached block. If not, the front-end processor 102a–102n can ask a back-end processor 108a–108n to load the requested block into the cache 106. Thus, a read request that the cache 106 cannot satisfy results in a read I/O operation. For a write request, the front-end processors 102a–102n can store the write data in the cache for subsequent writing to the physical disks 110a–110n by the back-end processors 108a–108n.

Described herein are a variety of techniques that can both enable a storage system, such as the Symmetrix® system, to devote greater resources to responding to read I/O requests and reduce the I/O burden of write requests. Generally speaking, these techniques include the definition of separate read-only and write storage areas and the use of "redirection" to route write requests away from the read-only areas. Freed, at least in part, from the duty of handling write requests, a physical disk storing a read-only area can devote more resources to read requests. This can, in turn, effectively increase the I/O speed of a storage system without requiring alteration or addition of physical storage.

To illustrate redirection, FIGS. 2–5 depict a partitioning of physical storage 132 into read-only 128 and write 130 areas. For example, a first set of spindles may be reserved for the read-only area 128 while a second set of spindles may be reserved for the write area 130.

As shown, the read-only area 128 includes two blocks having physical block addresses of "1" 128a and "2" 128b, respectively. Similarly, the write area 130 includes two blocks having physical block addresses of "3" 130a and "4" 130b, respectively. It should be noted that, for the purposes of illustration, FIGS. 2–5 present a greatly simplified data storage environment. That is, instead of a physical storage 132 area totaling four blocks 128a, 128b, 130a, 130b, physical storage 132 may feature, for example, 256 TB (Terabytes) of memory divided into 4K (Kilobyte) blocks (i.e., $2^{36}$ blocks).

Figure 2:
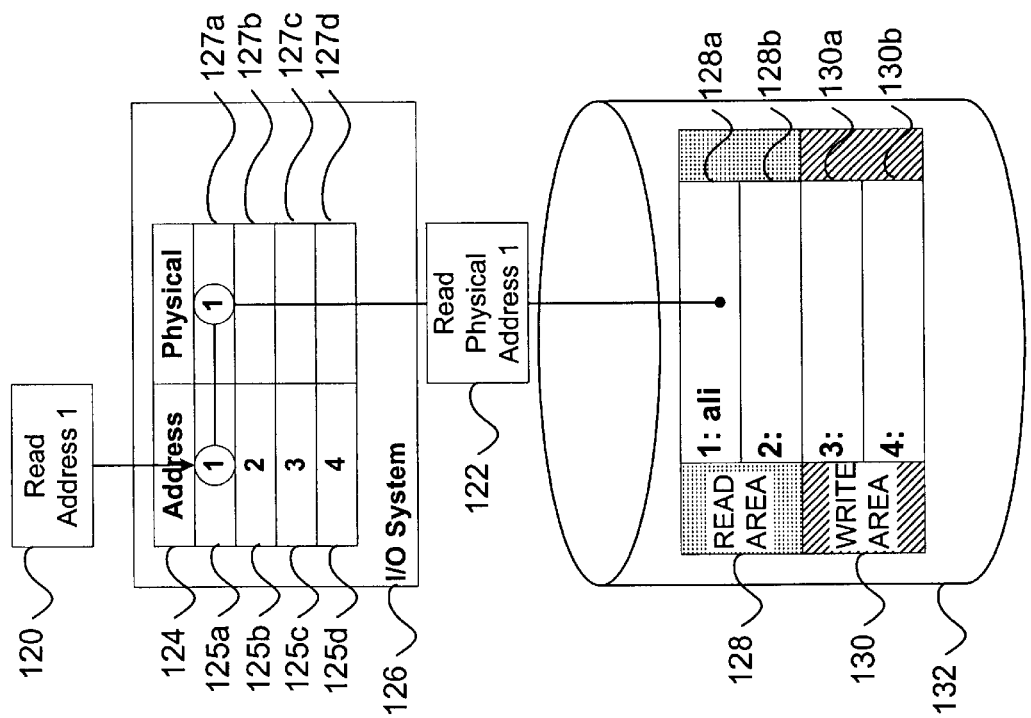
FIGS. 2–5 are diagrams illustrating data storage using read-only and write areas.
Figure 3:
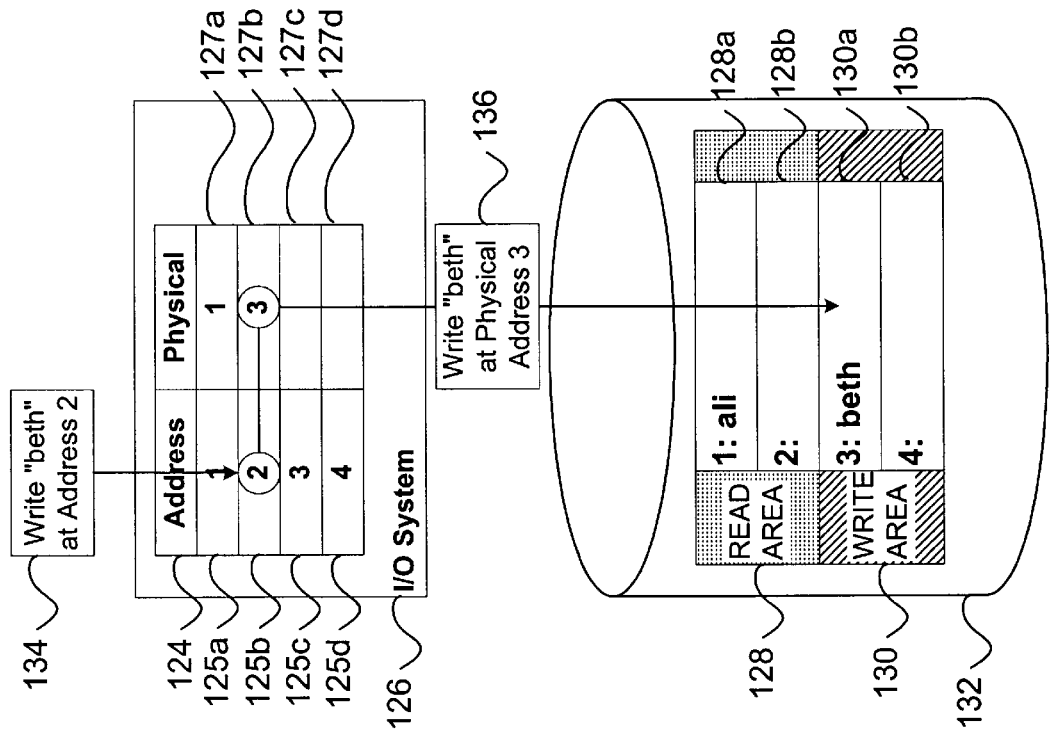

As shown in FIG. 2, an I/O system 126 receives I/O requests. For example, the I/O system 126 may receive requests that access to a cache did not satisfy. For instance, as shown, the I/O system 126 has received a read request 120 for a block stored at physical address "1". Instead of issuing a request for block "1" as specified by the request 120, the I/O system 126 accesses an I/O block table 124 that correlates the requested address 125a with the actual physical storage 132 block address 127a of the requested block. In the case shown in FIG. 2, the table 124 indicates that the requested block 125a is stored at the first block 128a of physical storage 132. The I/O system 126 can then issue a request to physical storage 132 for the data ("ali") stored at block "1" 128a.

In the sequence of FIG. 2, translating the requested block address 125a to the physical storage 132 block address 127a had no apparent affect (i.e., requested block "1" was coincidentally stored at physical block "1" 128a). However, introducing this redirection mechanism can enable the I/O system 126 to direct write requests away from the read-only area 128. For example, in FIG. 3, the I/O system 126 receives a request 134 to write data ("beth") at block address "2". Address "2" 128b of physical storage 132, however, currently falls within the address space 128 designated as read-only. Thus, the I/O system 126 determines a physical address of the next free block 130a in the write area 130 for storing the data. As shown, the I/O system 126 updates the I/O block table 124 to associate physical storage block address "3" 127b with the requested address, "2" 125b, and instructs 136 physical storage 132 to store the data in physical storage block "3" 130a.

Figure 4:
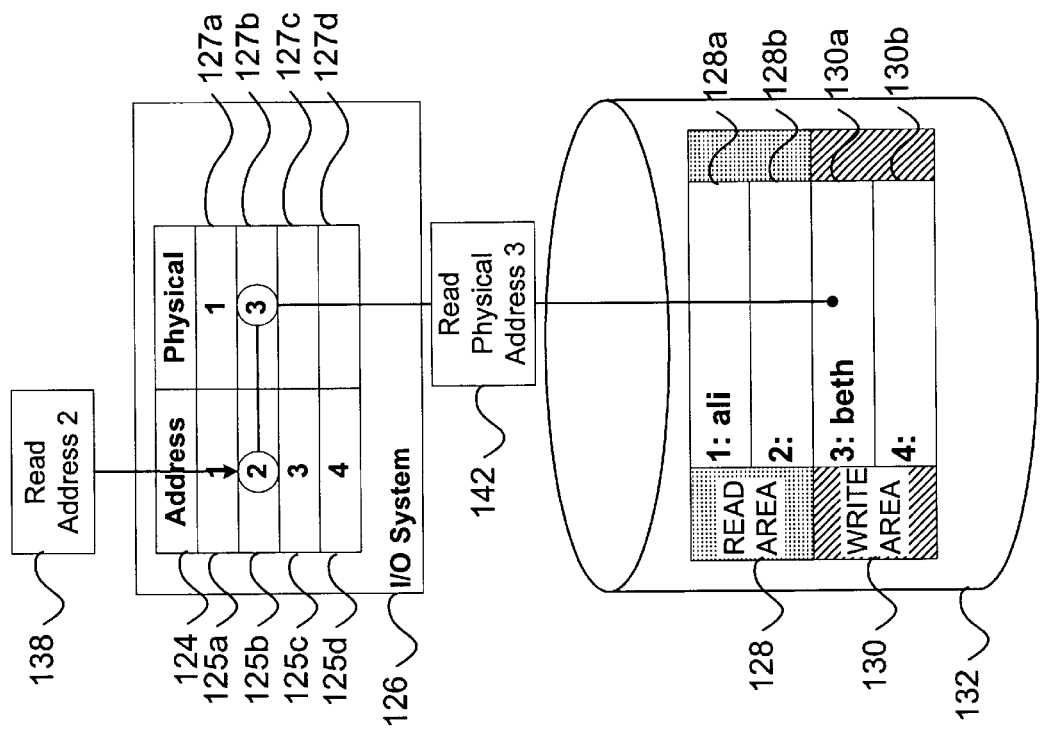

The I/O system 126 can implement such redirection "behind-the-scenes." For example, a host may have no idea that the data specified for storage at physical block address "2" 128b is actually physically stored at block "3" 130a. For instance, as shown in FIG. 4, when the I/O system 126 receives a read request 138 for the data block stored at address "2", the I/O system 126 can use the I/O block table 124 to determine the physical location 130a of the block. Thus, narrating FIGS. 3 and 4 from a host's view-point: the host requested storage of "beth" at physical block "2" (FIG. 3) and retrieved "beth" by specifying a read of physical block "2" (FIG. 4), exactly as expected by the host.

Figure 5:
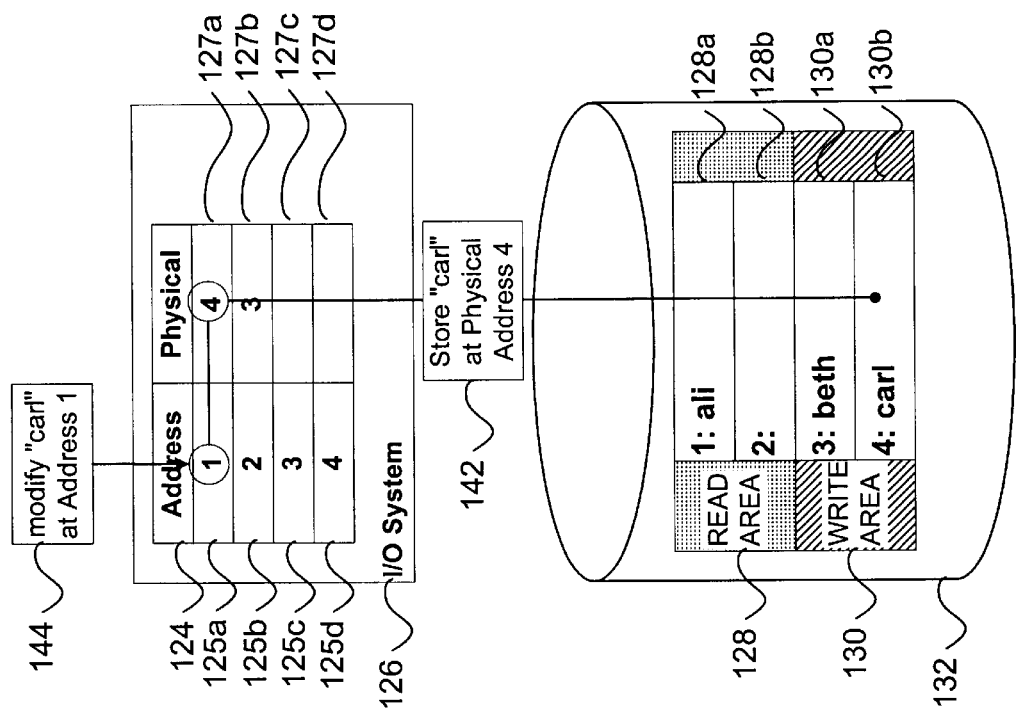

It should be noted that a write request need not specify insertion of new data, but may instead modify previously stored data. As shown in FIG. 5, the I/O system 126 can, again, direct such write requests away from the read-only area 128. That is, instead of modifying the data stored at the specified address, the I/O system 126 can determine the address of the next free block 130b in the write area 130 to store the modified data and update the I/O block table 124 accordingly. For example, a request 144 to change the value of block "1" from "ali" to "carl" causes the system 126 to store "carl" in physical block "4" 130b and change the physical address 127a associated with address "1" 125a from "1" to "4" 127a.

In addition to storage redirection, FIGS. 2–5 also illustrates sequential writing into the write area 130. That is, for each successive write operation, the system 126 uses the next sequential write area 130 location. Since physical devices generally store nearby blocks more quickly than blocks found at scattered locations, sequential access facilitates fast storage of writes.

Eventually, a write area 130 may run out of free blocks (e.g., blocks that do not store current data). However, as shown in FIG. 6, a system can create room for more sequential writes by collecting free blocks of an area 154 together, updating an I/O block table to reflect block rearrangement, and defining a new write area for the collected free blocks.

Figure 6:
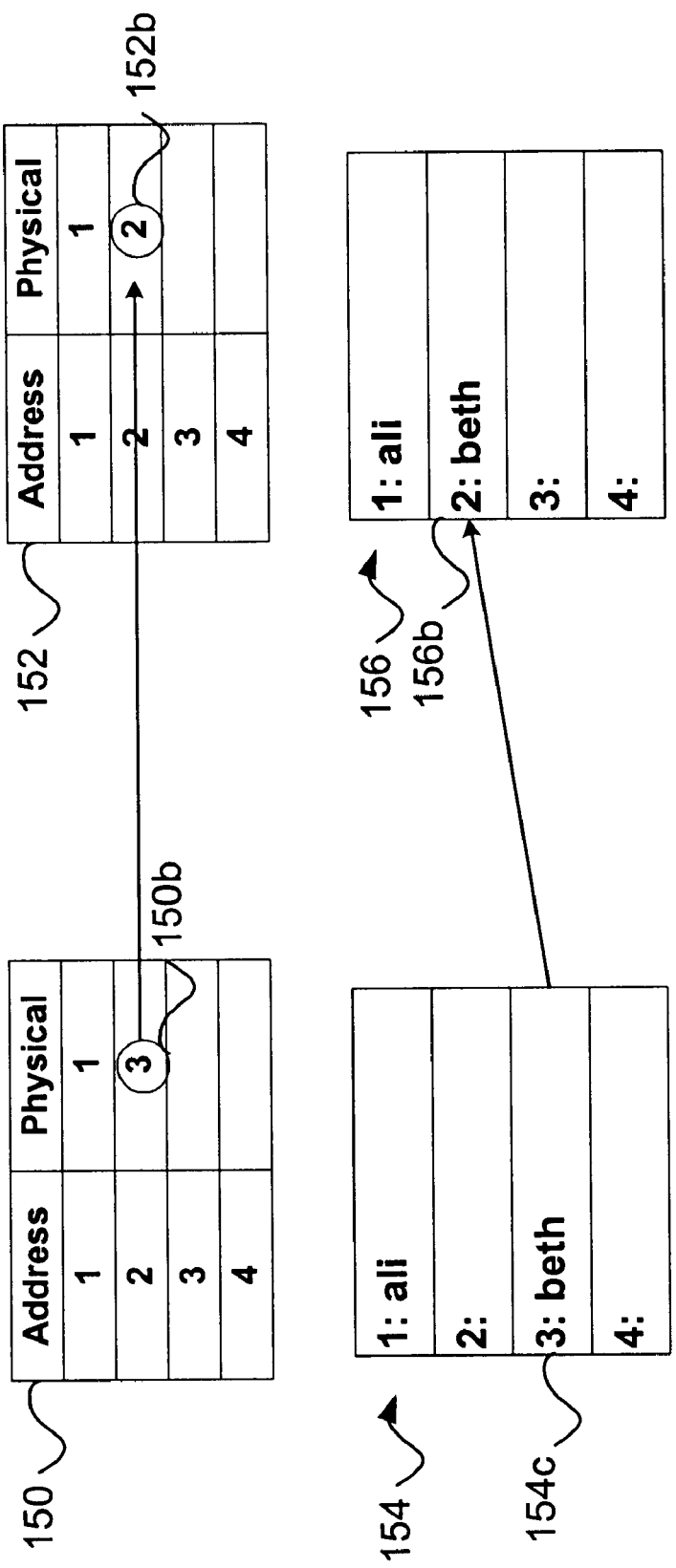
FIG. 6 is a diagram illustrating free block collection.

In greater detail, FIG. 6 depicts an I/O block table 150, 152 and physical storage area 154, 156 before and after aggregation-of free blocks. As shown, an area 154 initially features two free blocks, "2" and "4" interspersed between two used blocks, "1" and "3". After moving used block "3" 154c to physical address block "2" 156b and changing the I/O block table entry for block "3" from "3" 150b to "2" 152b physical storage 156 features a sequential two block area of free blocks, namely, blocks "3" and "4". The system may define this new collection of free blocks as a new write area and continue handling write operations sequentially. Again, though the system moves blocks around, the corresponding changes to the I/O block table 150, 152 enables an I/O system to maintain access to previously stored data.

Instead of operating on an active area (e.g., a read-only area) to collect free blocks, a system may create new write space by operating on a copy of active data. This permits the system to coalesce free blocks without interfering with on-going I/O operations. For example, a background process may handle block rearrangement and revision of I/O block table entries (e.g., entries for addresses "5" and "7") representing the rearrangement.

Figure 7:
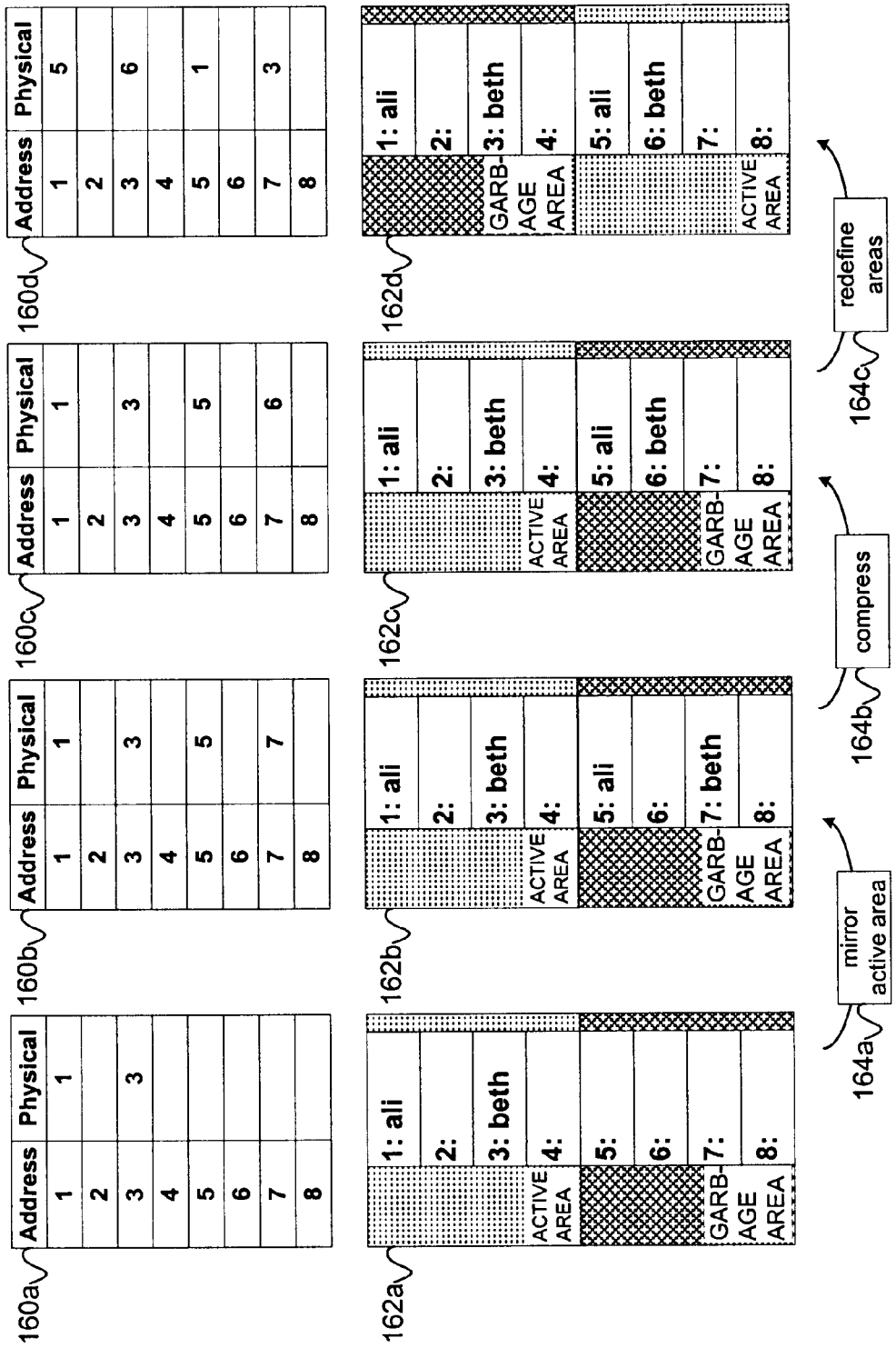
FIG. 7 is a diagram illustrating redefinition of storage areas.

FIG. 7 illustrates such free block collection using a "garbage area" copy of an active area. The garbage area may be assigned to different spindles than the active area to reduce impact on requested I/O operations.

In greater detail, FIG. 7 depicts physical storage 162a partitioned into an active area and a garbage area. As shown, mirroring 164a the garbage area copies the active area blocks into the garbage area and adds I/O block table 160b entries for the garbage area. A system can then collect 164b free blocks of the garbage area. Next, the system can redefine 164c the physical blocks that constitute the active and garbage areas. For example, blocks "5" to "8" of physical storage 162d which were previously allocated for the garbage area are now allocated for the active area. Similarly, blocks "1" to "4" of physical storage 162 which were previously allocated for the active area are now allocated for the garbage area.

As shown, to reflect the area redefinitions, a system has updated the I/O block table 160d. If not updated, addresses "1" to "4" of the table 160d would refer to physical blocks allocated for the new garbage area instead of the new active area. Thus, the system updates the physical addresses of the table 160d to preserve the links to the appropriate areas. That is, after updating, addresses "1" to "4" in the block table 160d are associated with physical addresses in the new active area and addresses "5" to "8" are associated with physical addresses in the new garbage area. Again, this ensures that while an I/O system may move physically stored blocks around, the I/O block table 160, nevertheless, maintains the external presentation of stored data expected by hosts.

FIGS. 2–7 illustrated techniques that included the use of an I/O block table to direct write requests away from a read-only area, the collection of free blocks to dynamically form a new write area, the use of a garbage area to collect free blocks in the background, and the redefinition of areas to use the newly collected free blocks for sequential writing. FIGS. 8–14 illustrate operation of a system that combines these techniques.

In greater detail, each of FIGS. 8–14 show physical storage 202 and an I/O block table 200 accessed by an I/O system 204. The table 200 includes a designation of the usage 210 of a physical address as "read-only", "write", or "garbage collection". The table 200 also includes a mapping of an address 208 to a physical block 212. To reduce the space occupied by the table 200, the address 208 may not be physically stored, but may instead represent an index into the table 200.

Figure 8:
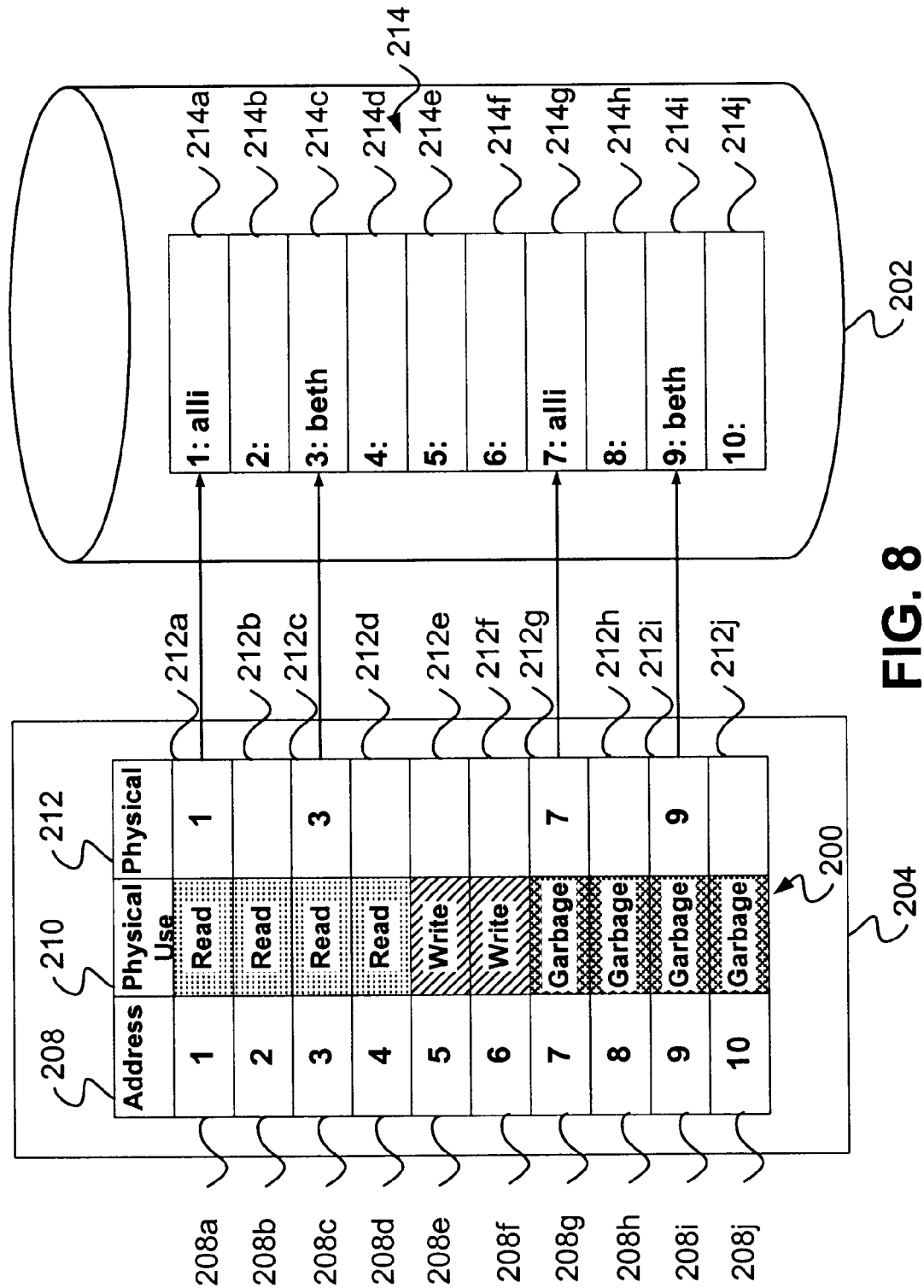
FIGS. 8–14 are diagrams illustrating operation of a data storage system.

FIG. 8 depicts the state of an on-going system. In this system, the I/O block table 200 usage 210 data defines physical blocks "1" to "4" 214a–214d as a read-only area, physical blocks "5" and "6" 214e–214f as a write area, and physical blocks "7" to "10" 214g–214j as a garbage collection area. Since the I/O block table 200 defines physical storage usage 210, partitioning physical storage can occur without communicating the partitioning scheme to the physical storage device(s). That is, the intelligence of the system may reside in the I/O block table 200 and associated software 204 (e.g., instructions executed by a back-end processor) rather than requiring modification of a host or physical storage device. The system may, however, use a priori knowledge of physical storage to ensure segregation of the different usage areas on different spindles through-out system operation.

Figure 9:
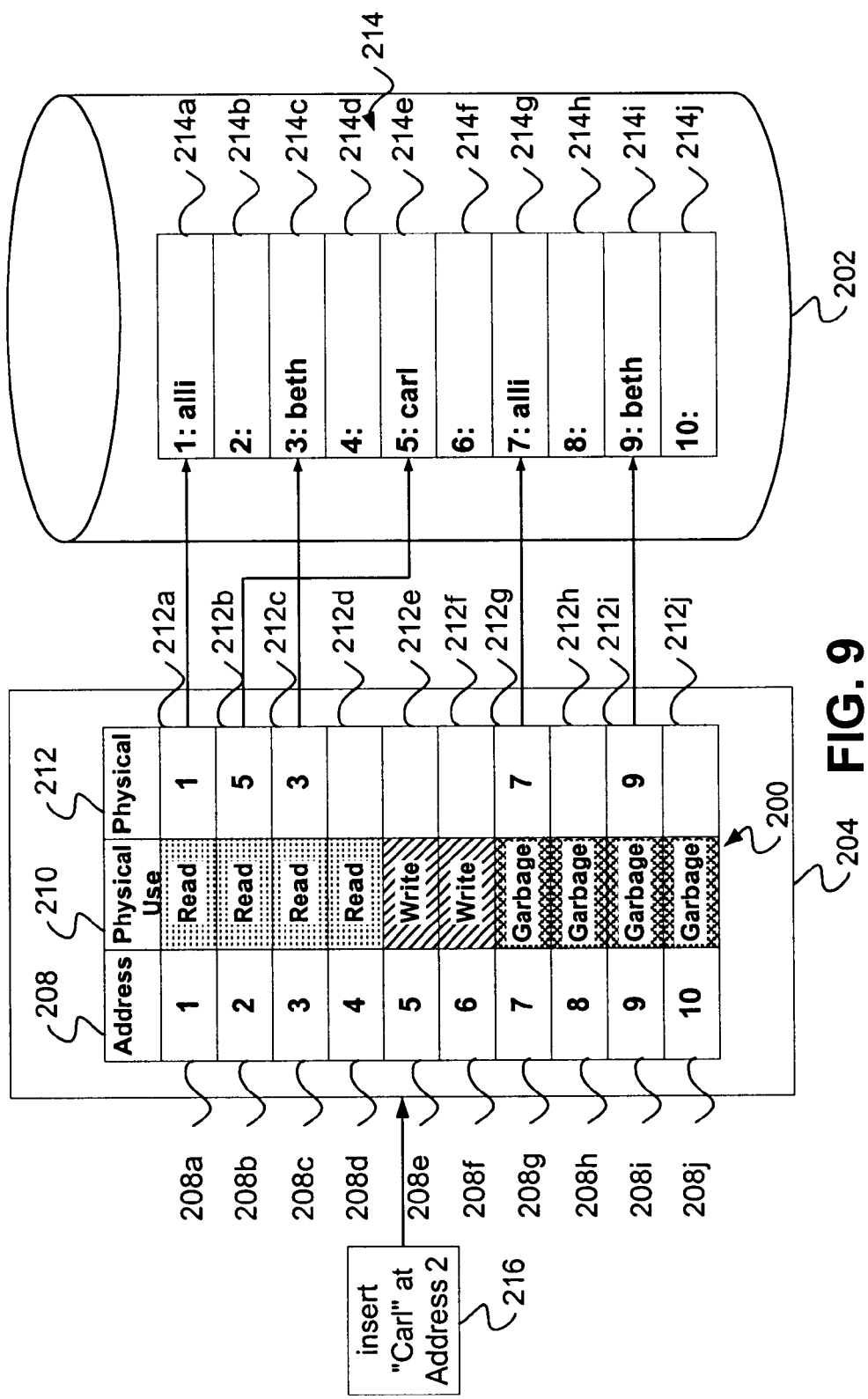

As shown in FIG. 9, the I/O system 204 receives a request 216 to insert "carl" at address "2". As shown in the I/O block table 200, address "2" 208b corresponds to a physical address designated 210 for read-only use. Thus, the I/O system 204 determines the next sequential block 214e in the designated write area for storing the data, for example, by incrementing a write area pointer. As shown, the I/O system 204 also updates the I/O block table 200 to designate physical block "5" 212b as the physical storage block address for address "2" 208b.

Figure 10:
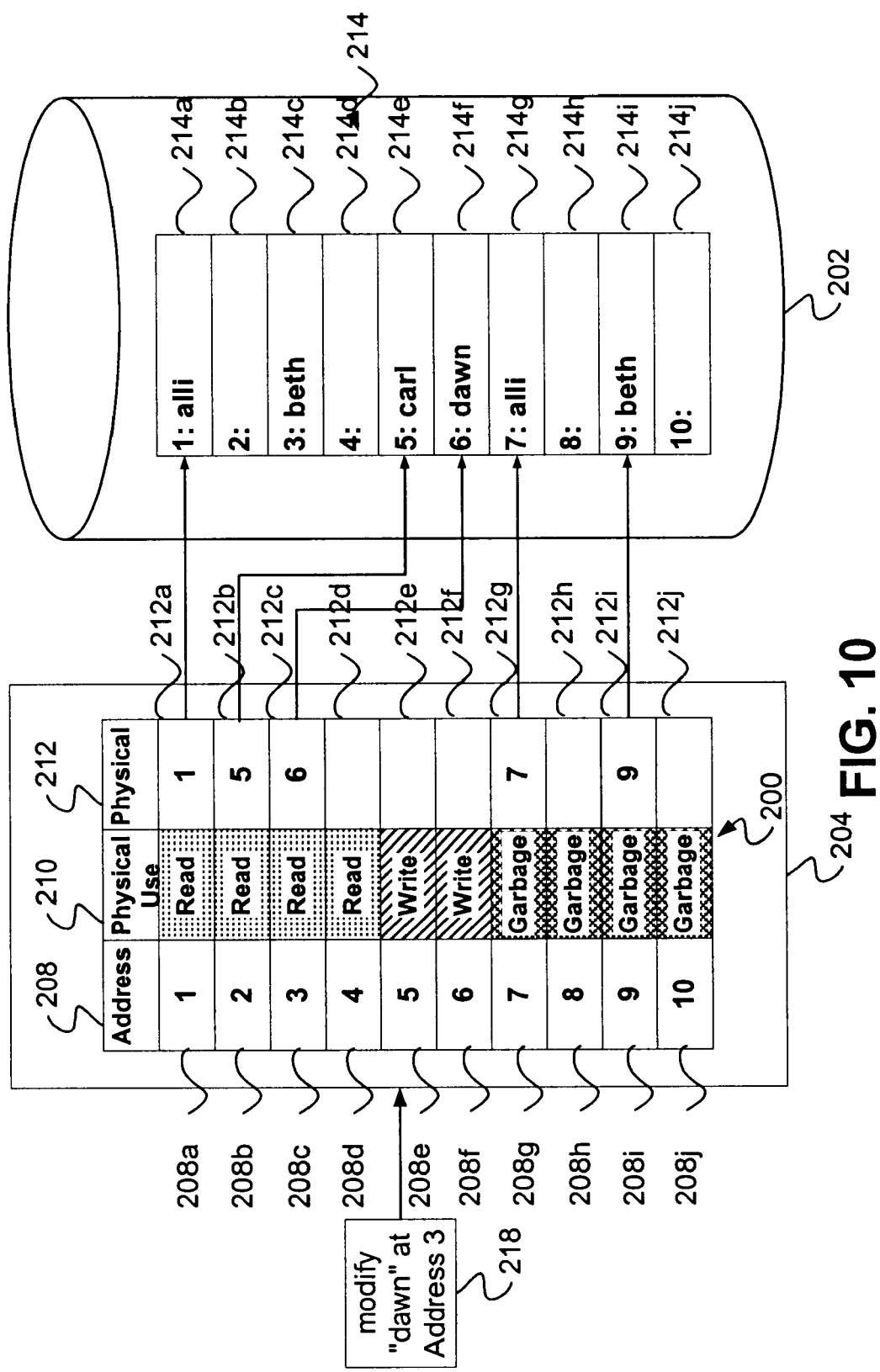

As shown in FIG. 10, the I/O system 204 next receives a request 218 to modify the data of address "3" from "beth" to "dawn". Again, the I/O block table 200 indicates address "3" 208c currently corresponds to a physical address designated for read-only use. Thus, the I/O system 204, determines the next sequential block in the write area 214f and updates the I/O block table 200 accordingly.

Figure 11:
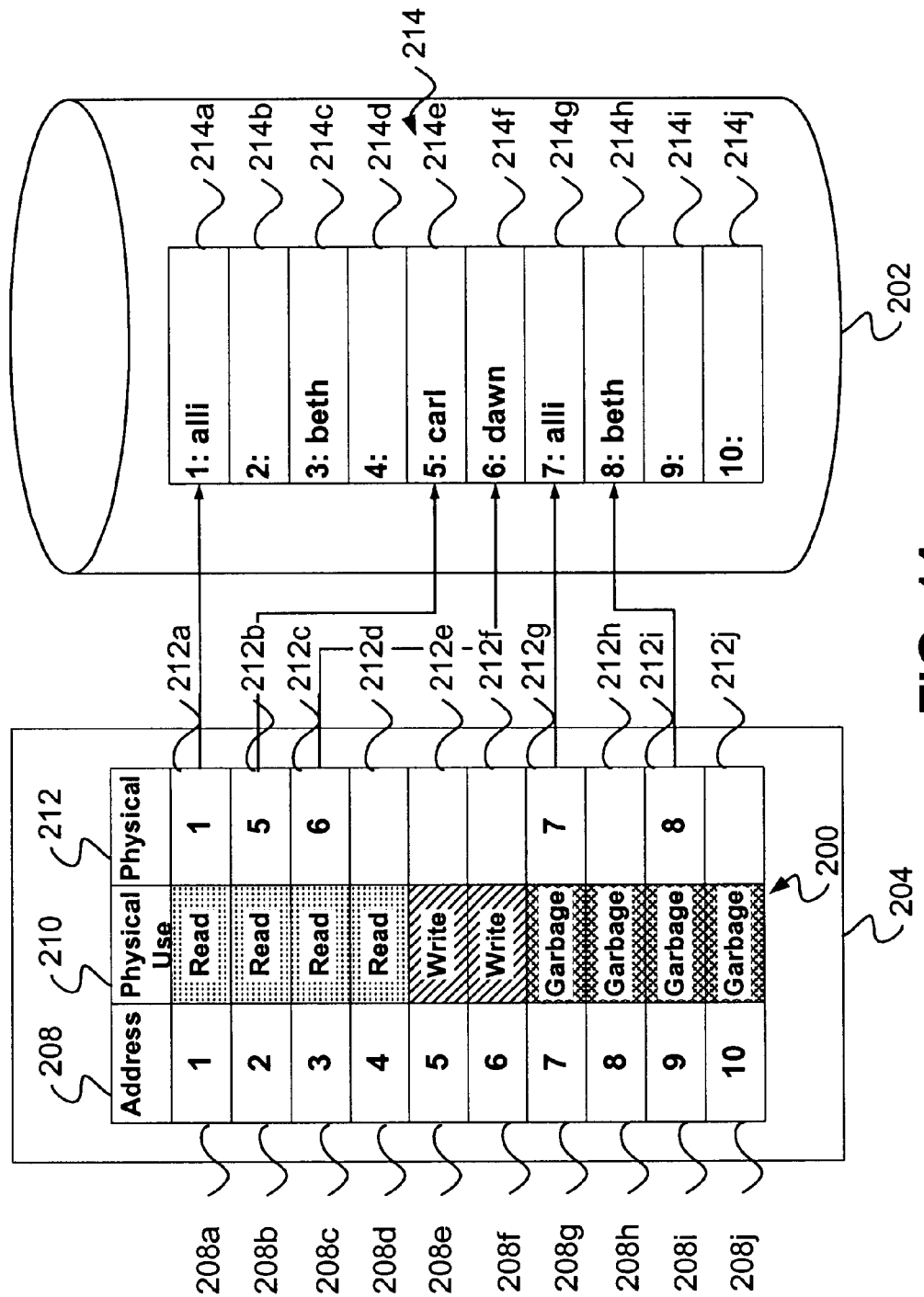

As shown in FIG. 11, while the I/O system 204 handles read and write requests, the I/O system 204 or another processor may collect free blocks in the garbage area together and correspondingly update the I/O block table 200. For example, comparing FIG. 10 to FIG. 11, a garbage collection process has moved the storage location of "beth" from physical block address "9" 214i to physical block address "8" 214h and updated the I/O block table 200 accordingly.

Figure 12:
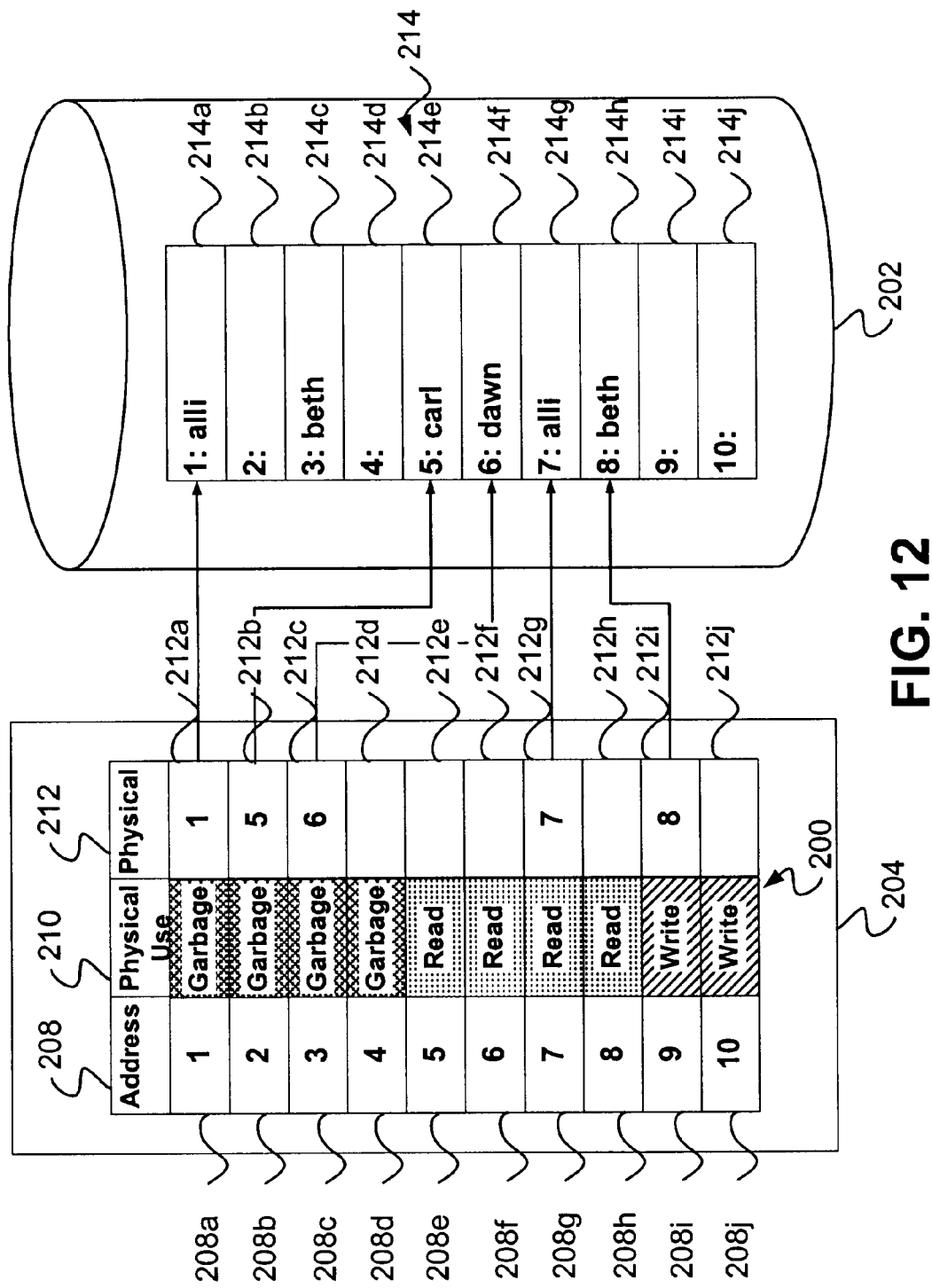
Figure 13:
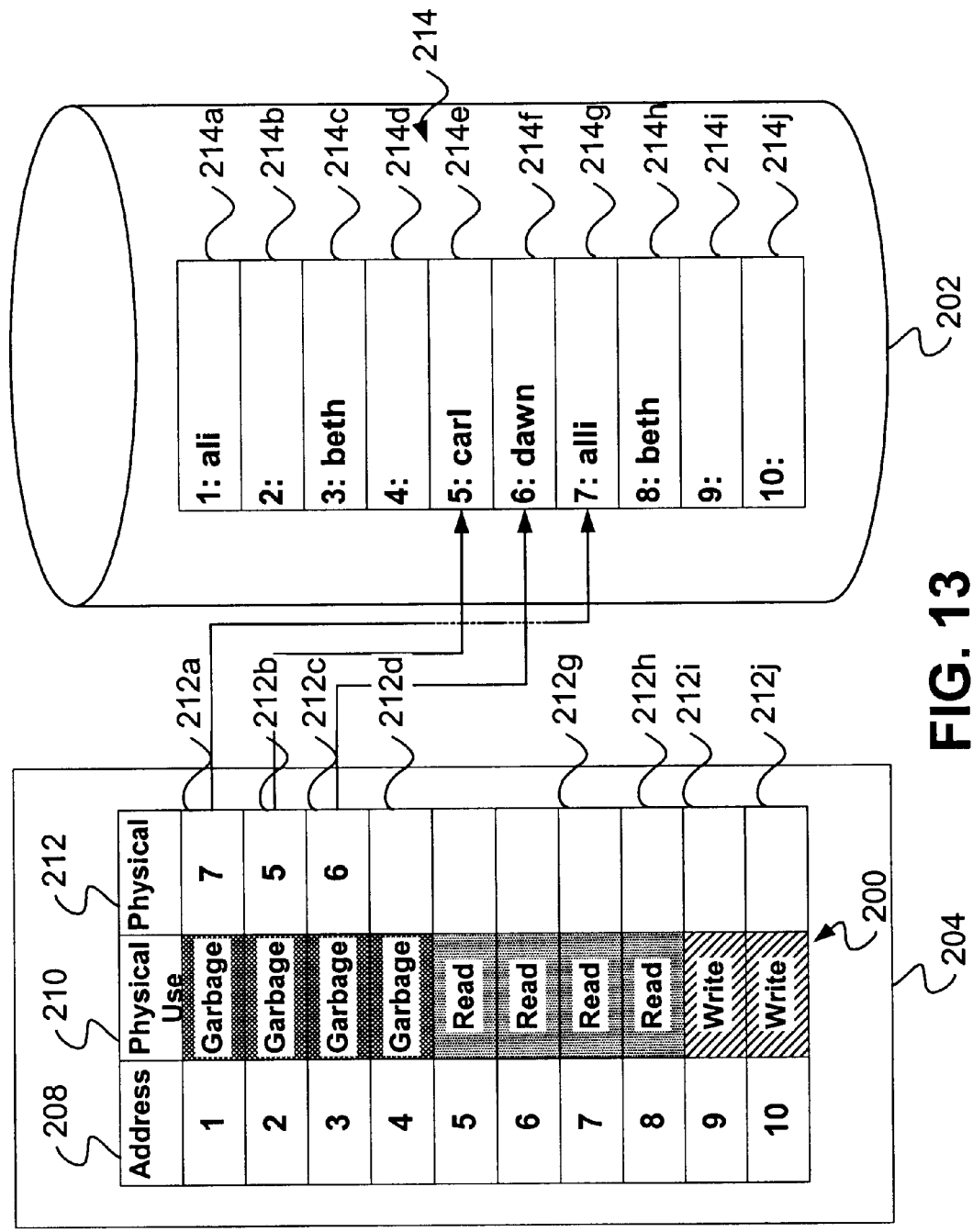

As shown in FIG. 12, at some configurable time (e.g., when the current write area nears full), the I/O system 204 can redefine the read-only, write, and garbage areas. As shown, the I/O system 204 changes the designated usage 210 of the I/O block table 200 to define the collected free blocks, physical blocks "9". and "10" 214i–214j, as the new write area; define the old read-only area, blocks "1" to "4" 214a–214d, as the new garbage area; and define a new read-only area from the old write area and the "compressed" old garbage collection area, blocks "5" to "8" 214e–214h. As shown in FIG. 13, the system 204 updates the I/O block table 200 so that the addresses "1" to "4" 208a–208d map to the new read-only area blocks 214e–214h. It should be noted that while the I/O block table 200 changes the use 210 designated for a particular physical address 208, the I/O block table 200 maintains the external view of data. For example, host requests for addresses "1" to "4" 208a–208d still resolve to physical address 212a–212d in the newly defined read-only area though the location of the read-only area has changed.

It should be noted that while FIGS. 12 and 13 are shown as discrete actions, a system may implement the area redefinition (FIG. 12) and I/O table update (FIG. 13) as a single atomic operation. For example, a substitute I/O block table may be built and swapped-in after completion.

Figure 14:
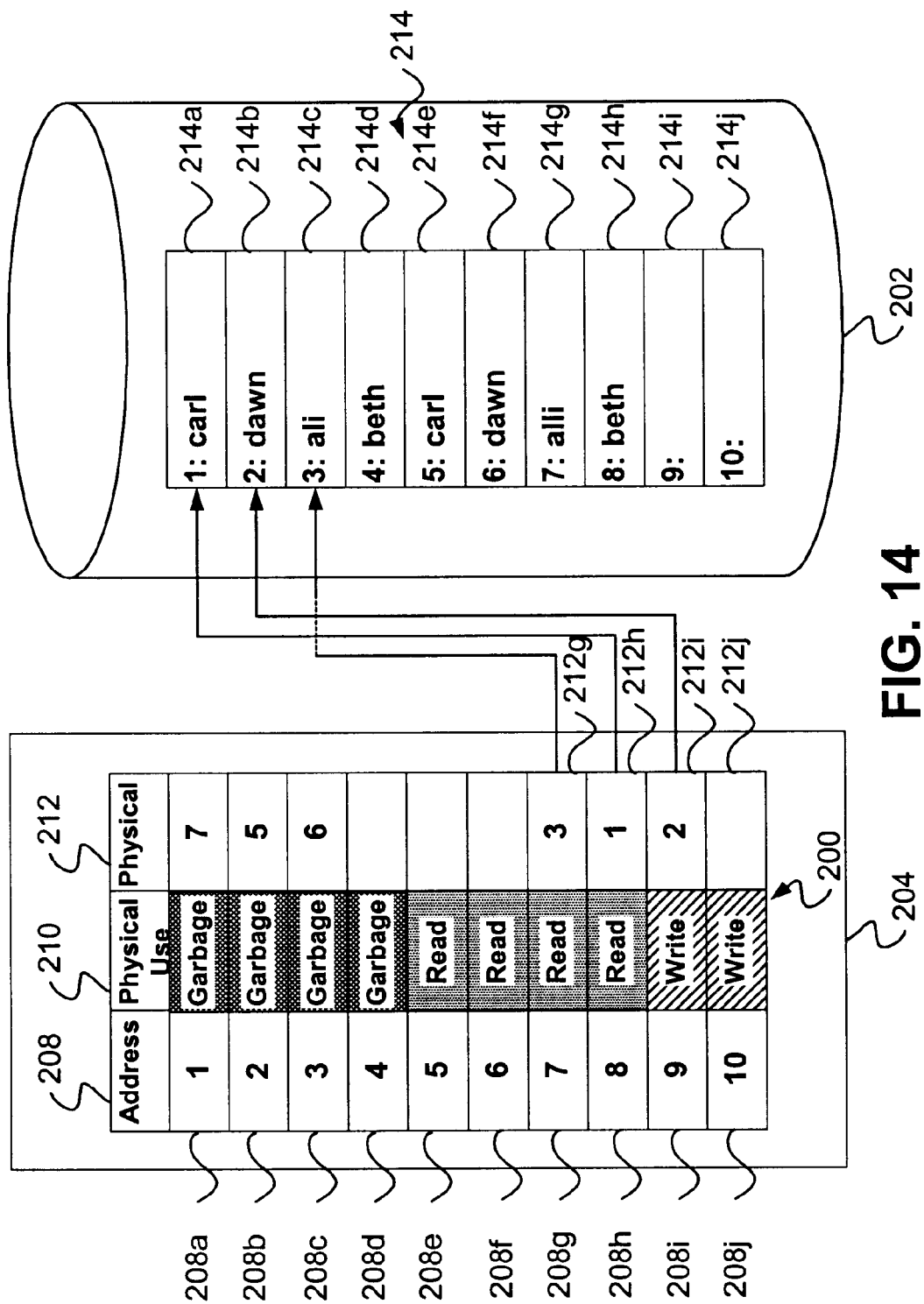

As shown in FIG. 14, at some point, the system 204 then mirrors the new read-only area by copying blocks "5" to "8" 214e–214h into the new garbage area, blocks "1" to "4" 214a–214d, and updates the I/O block table 200 accordingly. The process illustrated in FIGS. 8–14 then repeats anew.

Figure 15:
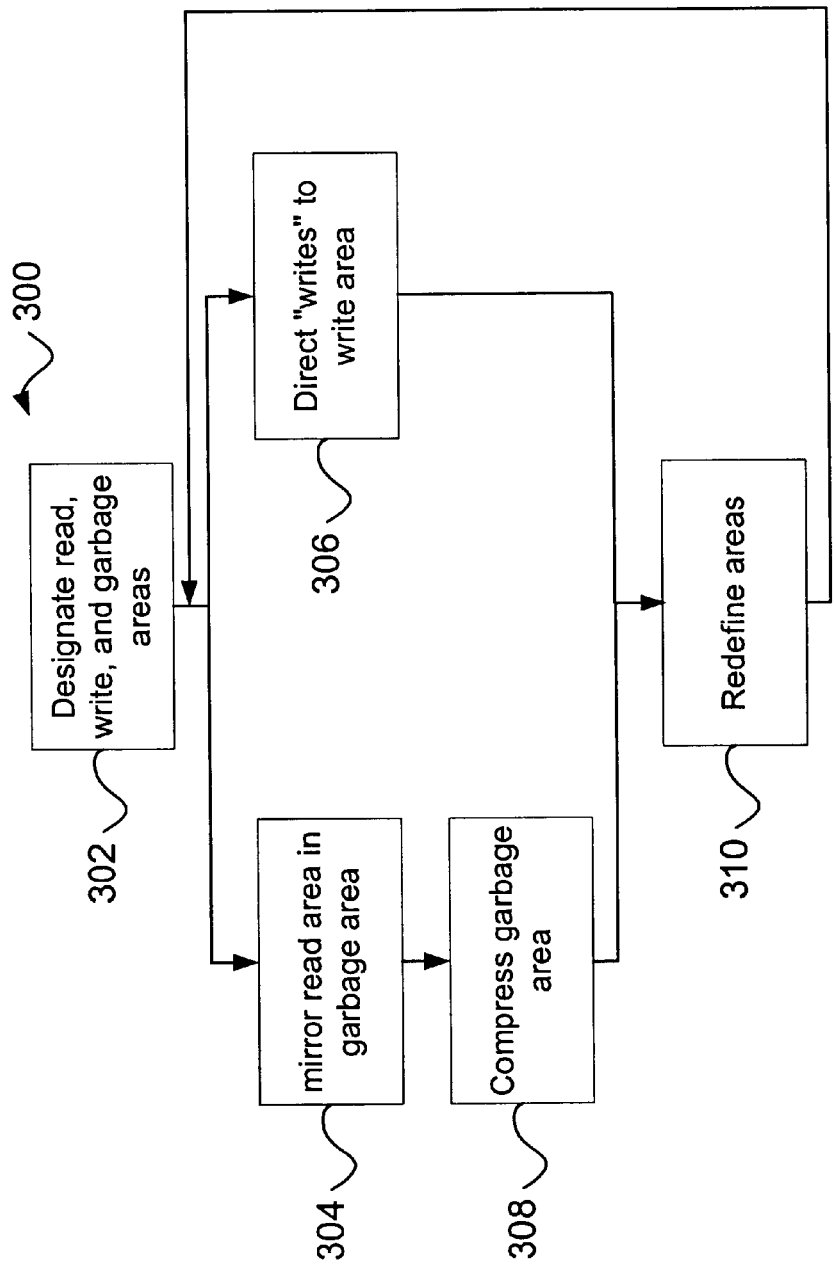
FIG. 15 is a flow-chart of a process for handling I/O requests.

To summarize an example of I/O system operation, FIG. 15 illustrates a process 300 for handling I/O requests. As shown, the process 300 designates 302 read-only, write, and garbage areas. The process 300 can direct 306 write requests away from the read-only area, for example, using the I/O block table described above. During this time, the process 300 can mirror 304 the read-only area in the garbage area and coalesce 308 free garbage area blocks. The process 300 then defines 310 new read-only, write, and garbage areas, and repeats. Thus, the process 300 continually, and in real-time, creates collections of free blocks and uses them for sequential write operations. Hence, the process 300 can replace scattered random writes with efficient sequential ones. As described above, the process 300 can also increase the amount of resources dedicated to processing read requests through the use of storage indirection.

While described against a backdrop of the Symmetrix® data storage system, the techniques described herein are not limited to a particular hardware or software configuration and may find applicability in a wide variety of computing or processing environments. The techniques may be implemented in hardware or software, or a combination of the two. For example, the techniques may be implemented in ASICs. The techniques may also be implemented in computer programs executing on programmable computers that each include a processor, a storage medium readable by the processor (including volatile and non-volatile memory and/or storage elements), at least one input device, and one or more output devices.

Each program is preferably implemented in high level procedural or object oriented programming language to communicate with a computer system. However, the programs can be implemented in assembly or machine language, if desired. In any case the language may be compiled or interpreted language.

Each such computer program is preferably stored on a storage medium or device (e.g., CD-ROM, hard disk, or magnetic disk) that is readable by a general or special purpose programmable computer for configuring and operating the computer when the storage medium or device is read by the computer to perform the procedures described herein. The system may also be considered to be implemented as a computer-readable storage medium, configured with a computer program, where the storage medium so configured causes a computer to operate in a specific and predefined manner.

Other embodiments are within the scope of the following claims.

What is claimed is:

1. A method of responding to storage access requests, the method comprising:

defining at least one write area and at least one read-only area;

receiving a write request, the request specifying a first address that resides within the at least one read-only area;

determining a second address in the write address area;

storing data associating the first address with the second address; and redefining the at least one write area and the at least one read-only area to form at least one new write area and at least one new read-only area, at least a portion of the new, read-only area occupying an area previously occupied by the at least one write area.

2. The method of claim 1, further comprising storing information included in the write request at the second address.

3. The method of claim 1, wherein determining the second address comprises determining the next sequential address of a write area.

4. The method of claim 1, further comprising:

receiving a read request specifying the first address;

accessing the data associating the first address and the second address; and requesting information stored at the second address.

5. The method of claim 1, further comprising defining at third area for storing a copy of at least one of the read-only areas;

copying data stored in at least one of the read-only areas into the third area; and collecting free blocks of the third area.

6. The method of claim 5, further comprising redefining the at least one read-only area, the at least one write area, and the third area such that at least a portion of the write area and at least a portion of the third area form a new read-only area.

7. A computer program product, disposed on a computer readable medium, for responding to storage access requests, the computer program including instructions for causing a processor to:

define at least one write area and at least one read-only area;

receive a write request, the request specifying a first address that resides within the at least one read-only area;

determine a second address in the address area;

store data associating the first address with the second address; and redefine the at least one write area and the at least one read-only area to form at least one new write area and at least one new read-only area, at least a portion of the new read-only area occupying an area previously occupied by the at least one write area.

8. The computer program of claim 7, comprising instructions for causing the processor to store information included in the write request at the second address.

9. The computer program of claim 7, wherein the instructions for causing the processor to determine the second address comprise instructions for causing the processor to determine the next sequential address of a write area.

10. The computer program of claim 7, further comprising instructions for causing the processor to:

receive a read request specifying the first address;

access the data associating the first address and the second address; and request information stored at the second address.

11. The computer program of claim 7, further comprising instructions for causing the processor to:

define a third area for storing a copy of at least one of the read-only areas;

copy data stored in at least one of the read-only areas into the third area; and collect free blocks of the third area.

12. The computer program of claim 11, further comprising instructions for causing the processor to redefine the at least one read-only area, the at least one write area, and the third area such that at least a portion of the write area and at least a portion of the third area form a new read-only area.

13. A system for handling I/O (Input/Output) requests, the system comprising:

(1) a collection of storage disks;

(2) a block table associating addresses specified by the I/O requests write addresses of the storage disks, the block table also defining at least one read-only area of the storage disks, at least one write area of the storage disks, and at least one third area of the storage disks; and (3) instructions for causing a processor to:

(a) process a read request by accessing the block table to determine the storage disk address associated with the address specified by the request;

(b) process a write request that specifies a storage disk address corresponding to the at least one read-only area of the storage disks by determining a next location in the at least one write area and storing information in the block table that associates the location in the at least one write area with the storage disk address specified by the write request; and (c) redefine the at least one read-only area, the at least one write area, and the at least one third area such that the redefined read-only area comprises a combination of the previously defined third area and the previously defined write area, and such that the redefined write area comprises free blocks collected in the previously defined third area.

14. The system of claim 13, further comprising instructions for causing the processor to:
   (d) copy information stored in the at least one read-only area to the third area, and
   (e) collect free blocks in the third area.

15. The system of claim 13,
   further comprising at least one cache; and
wherein the read request comprises a request for uncached information.

16. A method of managing storage, the method comprising:
   (1) defining a read-only storage area, a write storage area, and a first garbage storage area; and
   (2) repeatedly:
      (a) redirecting write requests for an address within the read-only storage area to the write area;
      (b) collecting free space in the garbage storage area; and
      (c) defining a new read-only storage area, a new write storage area, and a new garbage storage area such that the new read-only area includes the previously defined write area and the new write area includes collected free space in the new garbage storage area.

17. The method of claim 16, further comprising
   (d) copying data stored in the new read-only storage area to the new garbage storage area.

18. The method of claim 16, wherein the storage areas comprise physical storage areas.

19. The method of claim 18, wherein the write requests specify a physical address.

20. A method of responding to storage access requests, the method comprising:
   defining at least one write area and at least one read-only area;
   receiving a write request, the request specifying a first address that resides within the at least one read-only area;
   determining a second address in the write address area by determining the next sequential address of a write area;
   storing data associating the first address with the second address;
   storing information included in the write request at the second address;
   receiving a read request specifying the first address;
   accessing the data associating the first address and the second address;
   requesting information stored at the second address;
   defining at garbage area for storing a copy of at least one of the read-only areas;
   copying data stored in at least one of the read-only areas into the garbage area;
   collecting free blocks of the garbage area; and
   redefining the at least one read-only area, the at least one write area, and the third area such that at least a portion of the write area and at least a portion of the third area form a new read-only area.

* * * * *